United States Patent
Hines et al.

(10) Patent No.: US 7,209,041 B2
(45) Date of Patent: Apr. 24, 2007

(54) MOBILE RFID MANAGEMENT METHOD AND SYSTEM

(76) Inventors: Tony Hines, 12157 W. Linebaugh Ave., Tampa, FL (US) 33626; Steven Hill, 4505 S. Shamrock Rd., Tampa, FL (US) 33611; Dennis Lusk, 16540 Willow Glen Dr., Odessa, FL (US) 33556

(*) Notice: Subject to any disclaimer, the term of this patent is extended or adjusted under 35 U.S.C. 154(b) by 304 days.

(21) Appl. No.: 10/940,185

(22) Filed: Sep. 13, 2004

(65) Prior Publication Data
US 2005/0088304 A1  Apr. 28, 2005

Related U.S. Application Data

(60) Provisional application No. 60/502,594, filed on Sep. 12, 2003.

(51) Int. Cl.
*G08B 13/14* (2006.01)
(52) U.S. Cl. ............... 340/572.4; 340/539.32; 340/825.49
(58) Field of Classification Search ........... 340/572.1, 340/572.4, 539.3, 539.32, 539.16, 825.49, 340/539.21
See application file for complete search history.

(56) References Cited

U.S. PATENT DOCUMENTS

| | | | |
|---|---|---|---|
| 6,232,870 B1* | 5/2001 | Garber et al. | 370/572.4 |
| 2003/0102970 A1* | 6/2003 | Creel et al. | 340/572.1 |

* cited by examiner

*Primary Examiner*—Thomas Mullen
(74) *Attorney, Agent, or Firm*—Matthew G. McKinney

(57) ABSTRACT

The present invention is a mobile method and system for automatically monitoring the location and use of tools using radio-frequency identification ("RFID") tags. An RFID tag is secured to each tool with a unique numerical identifier. The RFID tag transmits its unique numerical identifier associated with each of the RFID tags using a RF signal, wherein the RF signal is transmitted at different intervals for each of the RFID tags. A receiver on a mobile platform reads the RF signals and determines the unique numerical identifier being transmitted. An information processor interconnected with the receiver analyzes the unique numerical identifier from a predetermined index, and the information processor determines whether any tools were not found on the index and automatically alerts a user when a tool is missing.

19 Claims, 2 Drawing Sheets

MOBILE RFID MANAGEMENT METHOD AND SYSTEM

CROSS-REFERENCE TO RELATED APPLICATIONS

This application claims the benefit of U.S. Provisional Application No. 60/502,594 filed Sep. 12, 2003. The disclosure of the provisional application is incorporated herein by reference.

BACKGROUND OF THE INVENTION

1. Field of the Invention

The present invention relates to radio frequency identification, and more specifically to a method and system using radio frequency identification tags to monitor the location of objects.

2. Description of the Prior Art

Many applications exist in which a set of tools is required to complete a task, commonly known as "tools of the trade." Examples of such tools of the trade include the equipment carried on police, fire, and ambulance vehicles, or on mobile radio and television production facilities. The tools are typically grouped together into a set depending on the task at hand.

A mobile platform is used for storing and transporting tools. For example, a cart for surgical instruments or a fire vehicle can provide a mobile platform. The mobile platform is transported to a remote destination where the tools are used to carry out a function or perform a task. Upon arrival at the remote destination, missing tools can cause severe problems in performing the necessary task. In addition, without an adequate method and system to monitor the tools, the mobile platform may return to its origination point without all the tools.

Some object management systems use bar codes that are affixed to the objects. In a typical example of such a system, an operator uses a hand-held bar code scanner to read the bar code on the objects. The bar code is read as the objects are loaded into the mobile platform before being transported to a remote destination where a function or task is performed. The bar codes are read again as the objects are unloaded upon returning from the remote destination. Such a system requires that all equipment be loaded and offloaded each time the mobile location performs a task or function. For mobile locations carrying hundreds of objects, this operation is time-consuming. In addition, missing tools are not identified until the mobile platform has returned from a remote site.

Various radio-frequency identification ("RFID") tag systems have been used in object management in the past and are currently in use. A typical system includes an RFID tag that provides non-volatile memory for storing information and a means well known in the art for interacting with an interrogator. The RFID tags contain identifier information associated with the particular objects to be managed and are attached to the objects. The RFID interrogator is used to detect the presence of an RFID tag and to read the information stored on the RFID tag. A typical RFID interrogator includes an RF transceiver for transmitting interrogation signals to the RFID tag and receiving response signals from RFID tags. The interrogator also includes one or more antennae connected to the transceiver and associated decoders and encoders for reading and writing the encoded information in the received and transmitted RF signals, respectively. After detecting a RFID tag attached to an object, an information processing unit associated with the interrogator determines that the object is present, and updates a database accordingly. However, the prior art RFID systems do not have the ability to provide a management system that allows a user to monitor the tools at a remote destination or to automatically alert a user when tools are missing.

It is desirable to provide a system and method that provides fall automation for the identification and management of tools of the trade on mobile platforms. There is a need for such a system that is adaptable for use with all of the wide variety of mobile platforms, such as police, fire and emergency vehicles, or individual users who must take a set of tools to a remote destination to perform a task and then return. There is also a need for such a system that operates in conjunction with a system wide information processor to maintain an inventory of tools involving a plurality of mobile platforms.

However, in view of the prior art at the time the present invention was made, it was not obvious to those of ordinary skill in the pertinent art how the identified needs could be fulfilled.

SUMMARY OF THE INVENTION

The invention provides for an automated identification and inventory management system for "tools of the trade" located on a mobile platform. One embodiment of the invention comprises a method for securing RFID tags each with a unique numerical identifier to a plurality of tools, transmitting the unique numerical identifier associated with each of the RFID tags using a RF signal, wherein the RF signal is transmitted at different intervals for each of the RFID tags, receiving the RF signals at a designated location, reading the RF signals and determining the unique numerical identifier being transmitted by each of the RFID tags, analyzing the unique numerical identifier for a corresponding identification of a tool from a predetermined index, determining whether any tools were not found on the index, and alerting a user when a tool is missing.

A mobile platform, such as an ambulance, a surgical cart, or a mobile television production facility, has mounted thereon an RFID receiver and an information processor. RFID tags are semi-permanently attached to the tools of the trade that are usually taken from the mobile platform in order to be used in some function or process. Examples of such tools might be a defibrillator in the case of an ambulance, or a television camera in the case of the mobile television production facility.

In another embodiment of the invention, a predetermined set of surgical tools required for a particular surgical procedure is gathered together on a cart and transported to an operating room. An information processor (e.g., a handheld computer) and RFID receiver are also present on the cart. Each of the tools to be used in the procedure has an attached RFID tag. The information processor contains an electronically stored index of the tools required to be present for the particular surgical procedure, and alerts the user if any necessary tool is missing prior to transporting the cart, i.e., mobile platform, to the operating room. During the surgical procedure, the information processor monitors the use of the tools. When the procedure is completed, the information processor alerts the user if any surgical tool has not been returned to the cart. In this manner, the system ensures that all required tools are present prior to beginning the surgery, and prevents mistakes such as inadvertently leaving a surgical tool in a patient after the surgical procedure.

In another embodiment of the invention, each RFID tag contains a unique identification number (identifier signal) that can be cross-referenced by the information processor to a particular piece of equipment or tool on an electronically stored index. The RFID tags transmit their information at times that are randomly distributed about some mean interval, for example 30 seconds. Thus, in this example, each RFID tag transmits its identifier signal on average twice every minute. Since the time taken to transmit the information is small relative to the average time interval between transmissions, the probability that the transmission of two or more RFID tags will overlap in time is negligible. Since the radio frequency (RF) signals transmitted by the tags are low power, the RFID receiver will only detect RFID tags when they are in proximity to the receiver. For example, when a tool is removed a predetermined distance from the mobile platform, the RFID receiver will no longer detect the signal from its tag and the information processor will alert the user that a tool is missing.

The information processor is interconnected to the RFID receiver for processing the signals received from the RFID tags and determining the identity of the objects to which the RFID tags are attached using an electronically stored index. The information processor may be located on the mobile platform or at a remote destination and interconnected with the receiver through a wireless connection, or a combination of both.

In the preferred embodiment of the invention, a user interface provides users on the mobile platform with information on the current state of the inventory of tools of the trade on the mobile platform. For example, the user interface may show a list of tools available on the mobile platform using a screen. The information processor may further be configured to provide audible or visible warnings when certain vital tools are not available on the mobile platform.

The information processor may also send information, such as the current status of the inventory on the mobile platform to another system wide information processor at a central site. This system wide information processor may then maintain inventory information on more than one set of tools of the trade on a plurality of mobile platforms.

In another embodiment of the invention, a plurality of RFID receivers on the mobile platform are each interconnected with a single information processor. In this way the location of various tools of the trade on the mobile platform may be grouped together or divided into a number of zones for easier location of specific tools. One or more of these RFID receivers may be removable from the mobile platform in order to maintain inventory information on tools that are temporarily in use at a remote destination from the mobile platform.

The information processor is also capable of providing information to users aboard a mobile platform as to the state of the inventory of the tools of the trade. This information may include lists of the tools available on the mobile platform and audible and/or visible warnings when vital tools are not available.

In another embodiment of the invention, one or more of the receivers may be removable from the mobile platform while remaining interconnected to the information processor through a wireless connection.

In another embodiment of the invention, a plurality of information processors on a plurality of mobile platforms are interconnected to a single system wide information processor at a central site. In this way an inventory of tools of the trade to be used on a plurality of mobile platforms can be automatically managed and controlled.

The specific embodiments described above provide a fully automated method and system for managing "tools of the trade" associated with a mobile platform that is transported to a remote destination to carry out a function or task. A primary object of the invention is to provide immediate feedback to the user of the mobile platform as to the availability of all necessary tools to carry out the proposed task, and the presence of all tools at the completion of the task prior to returning from the remote destination. Thereby the possibility for error or loss is minimized.

Another very important object of the invention is to provide a system and method that is adaptable for use with all of the wide variety of mobile platforms that might exist.

Still another important object is to provide a system and method can operate in conjunction with a system wide information processor and can manage and monitor all tools used by a number of distinct mobile platforms. By using the invention, mobile platforms will arrive at the remote destination with the full set of tools required to carry out the task or function and tool losses will be greatly reduced.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
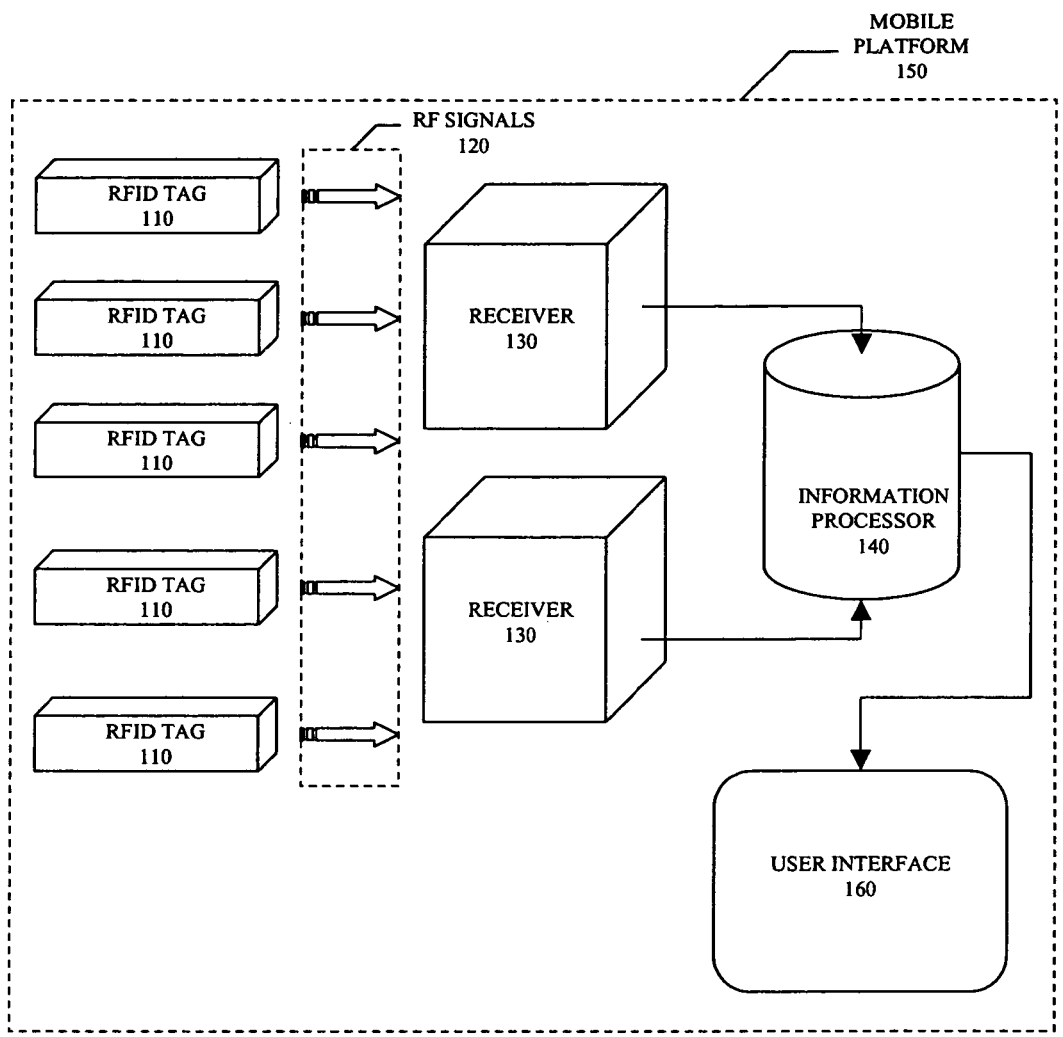
FIG. 1 is a block diagram view of an embodiment of the system.

Referring to FIG. 1, in one embodiment of the invention each RFID tag 110 is attached in a semi-permanent manner to the desired tools of the trade. The identifier information of the RFID tag 110 and an index regarding the tool of the trade to which the tag is attached is provided in a database electronically stored on the information processor 140. The RFID tags 110 that are attached to the desired tools of the trade transmit their identifier information using RF signals 120 to one or more receivers 130 on a mobile platform 150.

The receivers 130 are in one or more zones on the mobile platform 150, and each receiver 130 is interconnected to the information processor 140. In this manner the information processor 140 is continually and automatically monitoring the identifier information of all of the RFID tags 110 that are within RF reception range of the receiver or receivers 130 on the mobile platform 150. If there is more than one receiver 130 in one or more zones on the mobile platform 150 as illustrated in FIG. 1, then the information processor 140 analyzes and determines the correspondence between the identifier information of an RFID tag 110 and its spatial location as described by a zone on the mobile platform 150.

Using the information collected from the receiver or receivers 130 and the information stored in an index or database, the information processor 140 presents information about the tools of the trade to a user on board the mobile platform 150 via a user interface 160. Examples of such information might include lists of tools available on the user interface 160 or audible and/or visible warnings when certain crucial tools are not present. The information processor 140 on the mobile platform 150 may be connected through a wireless link, for example WLAN or cellular telephone, so that users at a location remote from the mobile platform 150 may in informed as to the state of the inventory of tools of the trade on the mobile platform 150.

Figure 2:
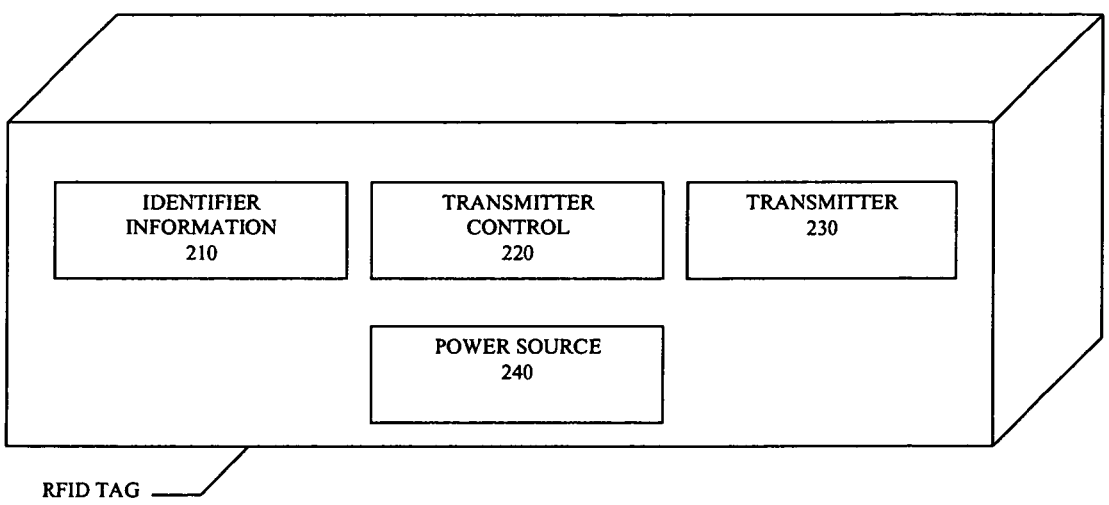
FIG. 2 is a block diagram view of an embodiment of a RFID tag for use with the system.

Referring to FIG. 2, each RFID tag 110 contains unique identifier information 210 and transmitter 230 to transmit the identifier information 210 using an RF signal. Each RFID tag 110 also contains a transmitter control means 220 well known in the field by which the RF signal is transmitted at a time interval that is randomly distributed about some average value. Alternatively, the time interval is predetermined. This reduces the probability of two or more RFID tags 110 transmitting their identifier information 210 during the same time causing interference. Each RFID tag 110 also contains a power source 240 that allows the RFID tag 110 to transmit its information on a regular basis for a long period of time, for example five years, without replacement.

Figure 3:
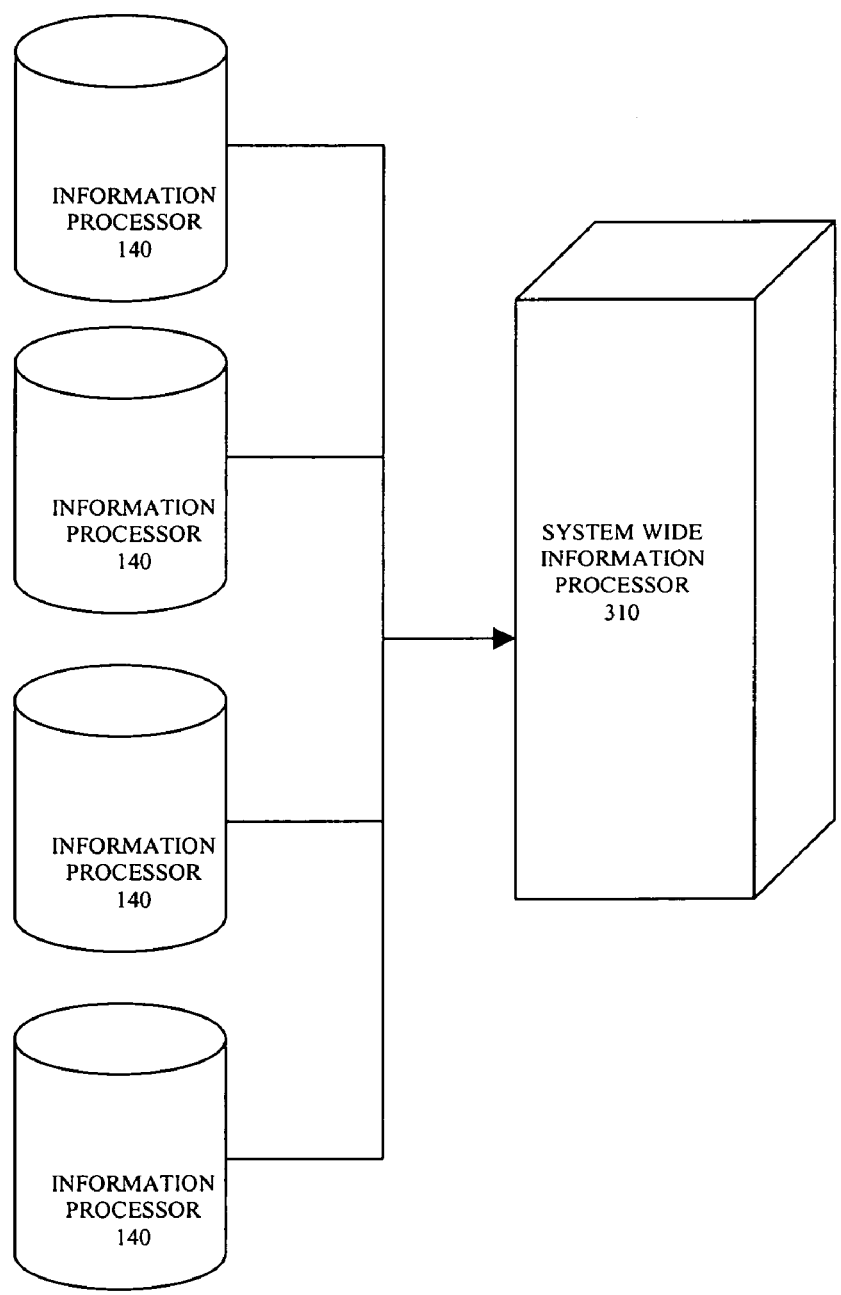
FIG. 3 is a block diagram view of another embodiment of the system illustrating a system wide information processor.

Referring to FIG. 3, there may be a number of information processors 140 corresponding to a particular set of tools and mobile platform 150 with each information processor 140 interconnected to a system wide information processor 310, whereby inventory control and management of tools of the trade on a multiplicity of mobile platforms can be facilitated. The system wide information processor 310 may be connected to each of the local information processors 140 through a number of different means such as a local area network or through a wireless link.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

Now that the invention has been described,

What is claimed is:

1. A method for managing a mobile RFID tag system, the method comprising:
   securing RFID tags each with a unique numerical identifier to a plurality of tools;
   transmitting the unique numerical identifier associated with each of the RFID tags using a RF signal, wherein the RF signal is transmitted at different intervals for each of the RFID tags;
   receiving the RF signals at a designated location;
   reading the RF signals and determining the unique numerical identifier being transmitted by each of the RFID tags;
   analyzing the unique numerical identifier for a corresponding identification of a tool from a predetermined index;
   determining whether any RFID tags were not detected for a tool on the index; and
   alerting a user when a tool is missing.

2. The method of claim 1 wherein the RF signals are necessarily low power so that the RF signals are only received when the RFID tags are in the proximity.

3. The method of claim 2 wherein the RF signals are transmitted at random times distributed around a mean interval of 30 seconds.

4. The method of claim 2 wherein the RF signals are transmitted at variably controlled times.

5. The method of claim 4 wherein the RF signals are transmitted intermittently in short predetermined intervals.

6. The method of claim 5 wherein the designated location is a mobile platform.

7. The method of claim 1 wherein the user is alerted to a missing tool by an audible warning.

8. The method of claim 1 wherein the user is alerted to a missing tool by a visible warning.

9. The method of claim 1 wherein the user is alerted to a missing tool by an audible and visible warning.

10. The method of claim 1 wherein the RFID tags each contain an independent power source.

11. The method of claim 1, and further comprising:
   receiving the RF signals from a plurality of receivers on a mobile platform wherein the receivers are interconnected to an information processor.

12. The method of claim 11 wherein a unique receiver is associated with a particular set of tools.

13. The method of claim 12 wherein the unique receiver and its particular set of tools is removable from the mobile platform to accompany the set of tools to a remote location.

14. The method of claim 13, and further comprising:
   providing a plurality of information processors wherein each information processor is interconnected to a system wide information processor.

15. A mobile RFID tag system comprising:
   a mobile platform;
   a set of tools wherein the set of the tools further comprises a plurality of tools;
   RFID tags each with a unique numerical identifier secured to the plurality of tools wherein the RFID tags transmit the unique numerical identifier using a RF signal;
   an RFID receiver on the mobile platform interconnected to a first information processor interconnected to a system wide information processor; the RFID receiver receives the RF signals transmitted by the RFID tags wherein the RF signals are necessarily low power so that the RF signals are only received when the RFID tags are in the proximity; the RF signals are transmitted intermittently at variably controlled times and in short predetermined intervals distributed around a mean interval of 30 seconds; the RFID receiver is removable from the mobile platform to accompany the set of tools to a remote location; the first information processor reads the RF signals and determines the unique numerical identifier being transmitted by each of the RFID tags and analyzes the unique numerical identifier from a predetermined index;
   a user;
   means for determining whether any RFID tags secured to the plurality of tools were not detected by the RFID receiver using the first information processor; and
   a warning means alerting the user when a tool is missing from the set of tools.

16. The system of claim 15 wherein the user is alerted to a missing tool by an audible warning.

17. The system of claim 15 wherein the user is alerted to a missing tool by a visible warning.

18. The system of claim 15 wherein the user is alerted to a missing tool by an audible and visible warning.

19. The system of claim 15 wherein the RFID tags each contain an independent power source.

* * * * *